(12) United States Patent
Stewart et al.

(10) Patent No.: US 6,435,529 B1
(45) Date of Patent: Aug. 20, 2002

(54) DETACHABLE FOOTPLATE FOR SCOOTERS

(76) Inventors: Harry Stewart, 236 2nd St.; Marc Firestone, 311 Eleventh St., both of Huntington Beach, CA (US) 92648

(*) Notice: Subject to any disclaimer, the term of this patent is extended or adjusted under 35 U.S.C. 154(b) by 0 days.

(21) Appl. No.: 09/778,977

(22) Filed: Feb. 2, 2001

(51) Int. Cl.[7] .................................................. B62B 7/00
(52) U.S. Cl. .............................. 280/87.041; 280/87.05; 188/19
(58) Field of Search ........................... 280/87.01–87.05, 280/639, 641; 188/19

(56) References Cited

U.S. PATENT DOCUMENTS

| | | | | |
|---|---|---|---|---|
| 4,145,065 A | * | 3/1979 | Kupka .................. | 280/87.01 |
| 4,821,832 A | * | 4/1989 | Patmount ............. | 280/87.041 |
| 6,168,175 B1 | * | 1/2001 | Lan ...................... | 280/87.041 |
| D444,185 S | * | 6/2001 | Stewart et al. ....... | D21/423 |
| 6,305,698 B1 | * | 10/2001 | Liang ................... | 280/87.041 |

* cited by examiner

Primary Examiner—Christopher P. Schwartz
(74) Attorney, Agent, or Firm—Steins & Associates

(57) ABSTRACT

A Detachable Footplate for Scooters is disclosed. The footplate easily attaches to and detaches from a conventional foot-powered, folding scooter to provide additional width to stand upon, as well as acting as a stand to prevent the scooter from falling over. The footplate permits the scooter stem to fold down by not interfering with the collapsibility of the scooter stem. Still further, the footplate can be configured to provide a headlight and tail/brake light to improve the scooter's safety

8 Claims, 5 Drawing Sheets

DETACHABLE FOOTPLATE FOR SCOOTERS

BACKGROUND OF THE INVENTION

1. Field of the Invention

This invention relates generally to accessories for scooters and, more specifically, to a Detachable Footplate for Scooters

2. Description of Related Art

Portable, collapsible scooters have become one of the hottest consumer products for children since the Skateboard. With the evolution of lightweight, durable materials, manufacturers are able to create an extremely, versatile and convenient toy and means for transportation. As the portable scooter has grown in popularity, so has the market for attachments or additions to the scooters. It seems that it is no longer sufficient to simply own a scooter, it is further necessary that your scooter is different from everyone else's. Still further, there are a few areas that are lacking in the conventional scooter design; namely, the fact that the deck of the scooter is relatively short and narrow (presumably to provide a compact, lightweight package).

The problem with the current scooter deck design is that as the child reaches ten years old, his or her feet become too large-to both fit comfortably on the scooter deck at the same time. As a result, the older user's feet have a tendency to slip off. What is needed is a way to enlarge the scooter deck such that the user with larger feet will not be in fear of his or her feet slipping off of the scooter.

Still further, none of the scooters have been provided with any safety lighting, such as a head light or tail light. In addition to the aesthetic benefits of a lighting system, adding lights to the conventional scooter will provide additional utility to the scooter; namely the ability to ride the scooter safely in darkened conditions.

SUMMARY OF THE INVENTION

In light of the aforementioned problems associated with the prior devices, it is an object of the present invention to provide a Detachable Footplate for Scooters. The footplate should attach easily to a conventional foot-powered, folding scooter to provide additional width to stand upon, as well as acting as a stand to prevent the scooter from falling over. The footplate should permit the scooter stem to fold down, by not interfering with the collapsibility of the stem. Still further, it is an object that the footplate be configured to provide a headlight and tail/brake light to improve the scooter's safety.

BRIEF DESCRIPTION OF THE DRAWINGS

The objects and features of the present invention, which are believed to be novel are set forth with particularity in the appended claims. The present invention, both as to its organization and manner of operation, together with further objects and advantages, may best be understood by reference to the following description, taken in connection with the accompanying drawings, of which:

FIG.4 is a perspective view of the combination of FIG. 1, wherein the scooter stem has been folded;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic-principles of the present invention have been defined herein specifically to provide a Detachable Footplate for Scooters.

Figure 1:
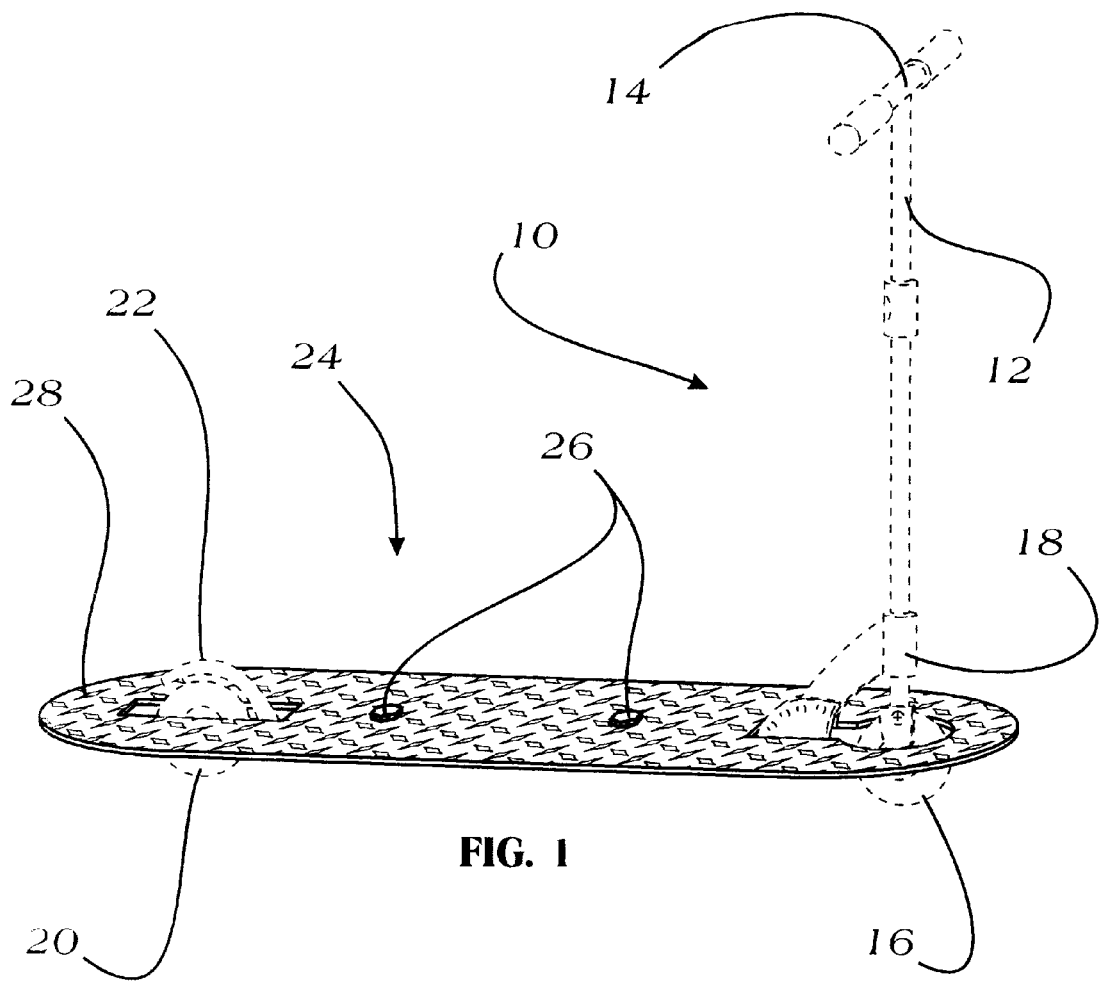
FIG. 1 is a perspective view a preferred embodiment of the footplate of the present invention as it attaches to a conventional scooter.

The present invention can best be understood by initial consideration of FIG. 1. FIG. 1 is a perspective view of a preferred embodiment of the footplate 24 of the present invention as it attaches to a conventional scooter 10. As depicted, the common lightweight collapsible scooter 10 comprises a telescoping stem 12 extending between a pair of collapsible handlebars 14 and a front wheel 16 of the type used in in-line skates. The stem 12 passes through, is held erect by, and is permitted to pivot by the stem bracket 18. The stem bracket 18 is also collapsible, which permits the stem 12 and handlebars 14 to be folded down against the scooter deck (not shown).

In the rear, the conventional scooter 10 has a second, rear wheel 20 of the same type as the front wheel 16. The rear wheel 20 assembly typically includes a fender/brake assembly 22; when the rider steps onto the fender/brake assembly 22, it acts as a friction brake on the rear wheel 20.

In the preferred form shown, the footplate 24 of the present invention attaches to the scooter deck (not shown) by a variety of conventional methods, including by the bolt-type fasteners 26 shown. In this depicted embodiment, the footplate 24 is constructed from a lightweight, aluminum material having a textured top surface 28 to inhibit the rider's feet from slipping.

As can be seen, the footplate 24 attaches directly to the scooter 10 with only minor modification for attachment means. Once attached, the foot plate 24 provides a wide deck upon which the rider can stand more comfortably than with the original scooter 10. Furthermore, the footplate 24 actually acts as a sort of "kickstand," in that its edge will touch the ground before permitting the scooter 10 to fall over. If we now turn to FIG. 2, we can examine other aspects of the present invention.

Figure 2:
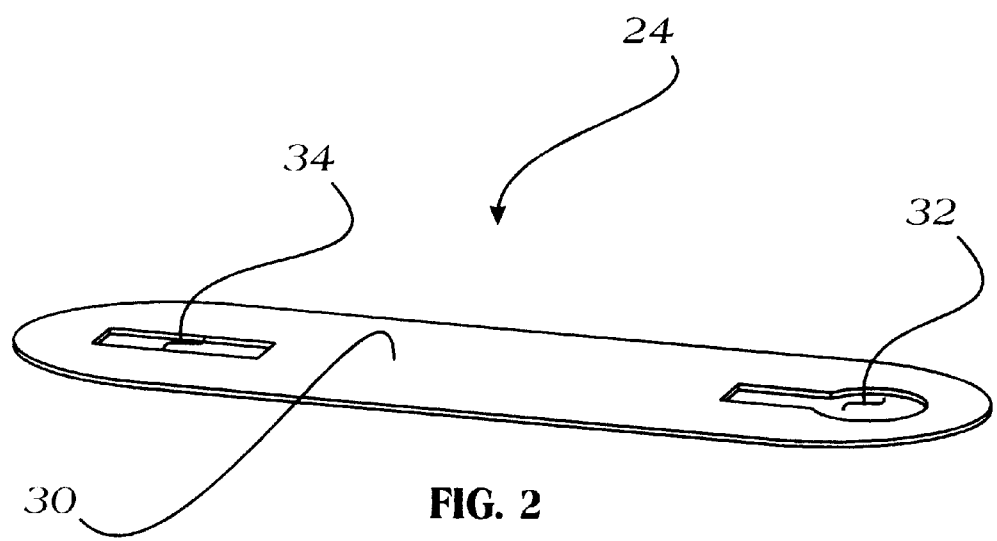
FIG. 2 is a perspective view of the footplate of FIG. 1 having a nontextured top surface.

FIG. 2 is a perspective view of the footplate 24 of FIG. 1 having a non-textured top surface 28. In this version, the deck 30 is provided with a front wheel aperture 32 and a rear wheel aperture 34. The front wheel aperture 32 is designed to include a rounded front portion sized to permit free rotation of the scooter front wheel (see FIG. 1), and a slotted rear portion to accommodate the support structure of the stem bracket (see FIG. 1). The rear wheel aperture 34 is preferably shaped in a slotted or rectangular form to permit the conventional rear wheel and fender/brake assembly to pass therethrough (see FIG. 1). It should be understood that the deck 30 can be constructed of aluminum, steel, wood, plastic or any other material that is sufficiently rigid and durable while still providing a light-weight product. Now turning to FIG. 3, we can examine additional features of the present invention.

Figure 3:
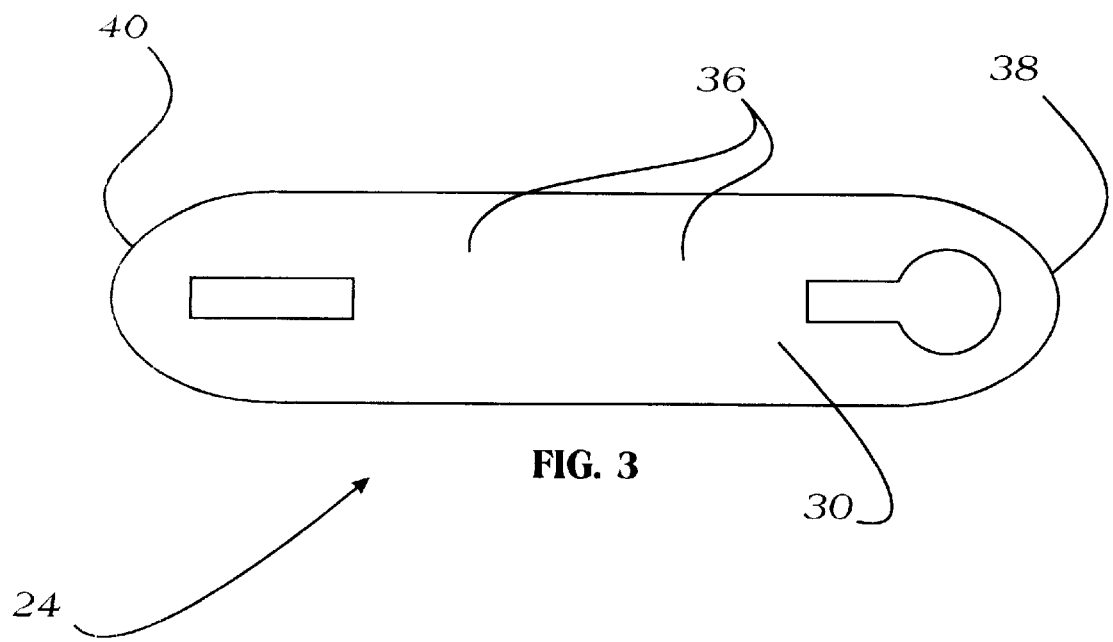
FIG. 3 is a top view of the footplate of FIGS. 1 and 2.

FIG. 3 is a top view of the footplate 24 of FIGS. 1 and 2. In this embodiment, the front end 38 and rear end 40 of the footplate 24 are rounded for maximum durability, safety and for a sleeker profile. In other embodiments, other shapes for the front and rear end 38 and 40, respectively, may be provided, depending upon the particular application of the footplate 24. Also depicted in this figure is the pair of fastener apertures 36 formed in the deck of the footplate 24; bolts, screws and/or rivets can be inserted through these apertures 36 and into the scooter 10 such that the footplate 24 is detachably attachable to the conventional scooter 10. Now looking at FIG. 4, we can discuss yet another benefit of the present invention.

Figure 4:
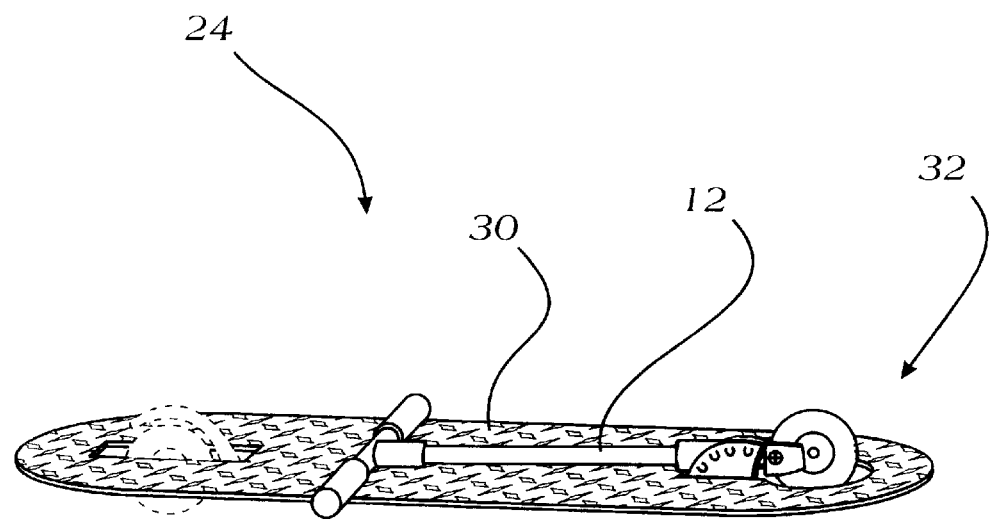
FIG. 4 is a side view of the footplate of FIG. 1–3.
Figure 5:
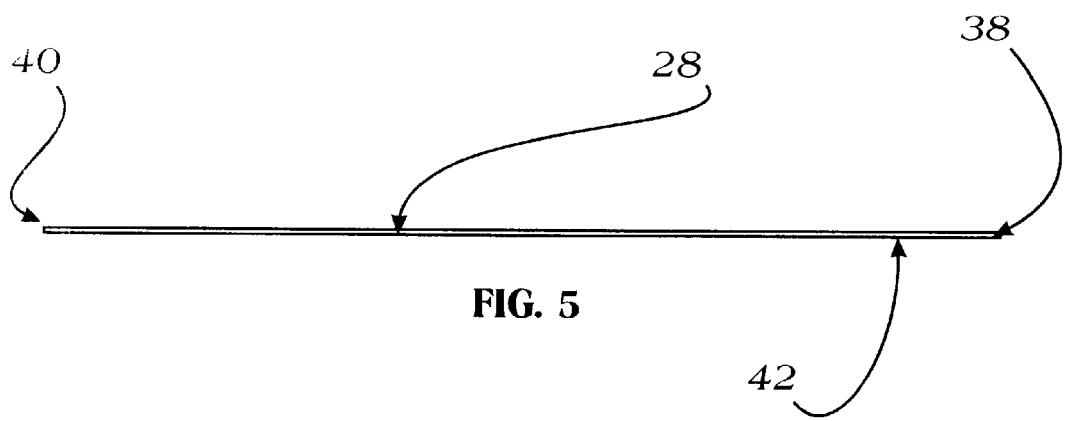
FIG. 5 is a side view of the footplate of FIGS. 1–4.
Figure 6:
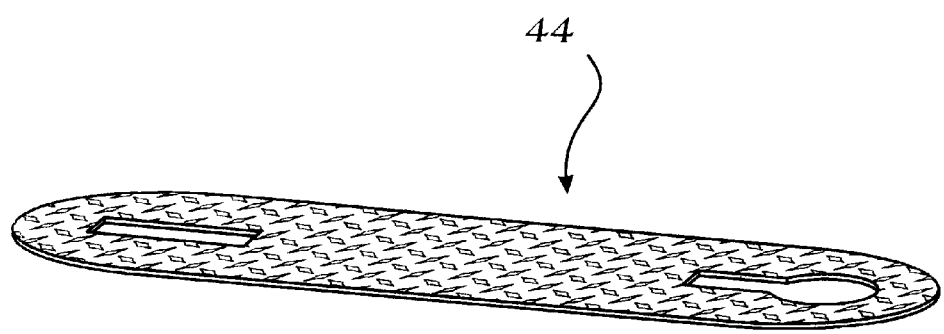
FIG. 6 is a perspective view of the footplate of FIGS. 1–5, having a textured top surface.

FIG. 4 is a perspective view of the combination of FIG. 1, wherein the scooter stem 12 has been folded down. As is shown here, the stem 12 will fold flat against the deck 30 of the footplate 24, such that the scooter can be easily carried and stored, just as the scooter 10 was originally designed. A further benefit of the addition of the footplate 24 to the scooter 10 is that when the stem 12 is folded down as shown, the entire combination (i.e. the scooter 10 and footplate 24) can be hung from a wall by the front wheel aperture 32 for storage. Without the footplate 24, this storage method would not be possible. As shown in FIG. 5 (a side view of a preferred footplate), and as discussed above, the footplate 24 is manufactured from thin, rigid material, and may or may not have textured surface 44 (see FIG. 6) on its top surface 28. In other embodiments, the top surface may have artwork, wording or other designs inscribed upon (or embedded into) the top surface 28 in order to improve the individuality of the footplate 24, as well as improving the aesthetics.

Figure 7:
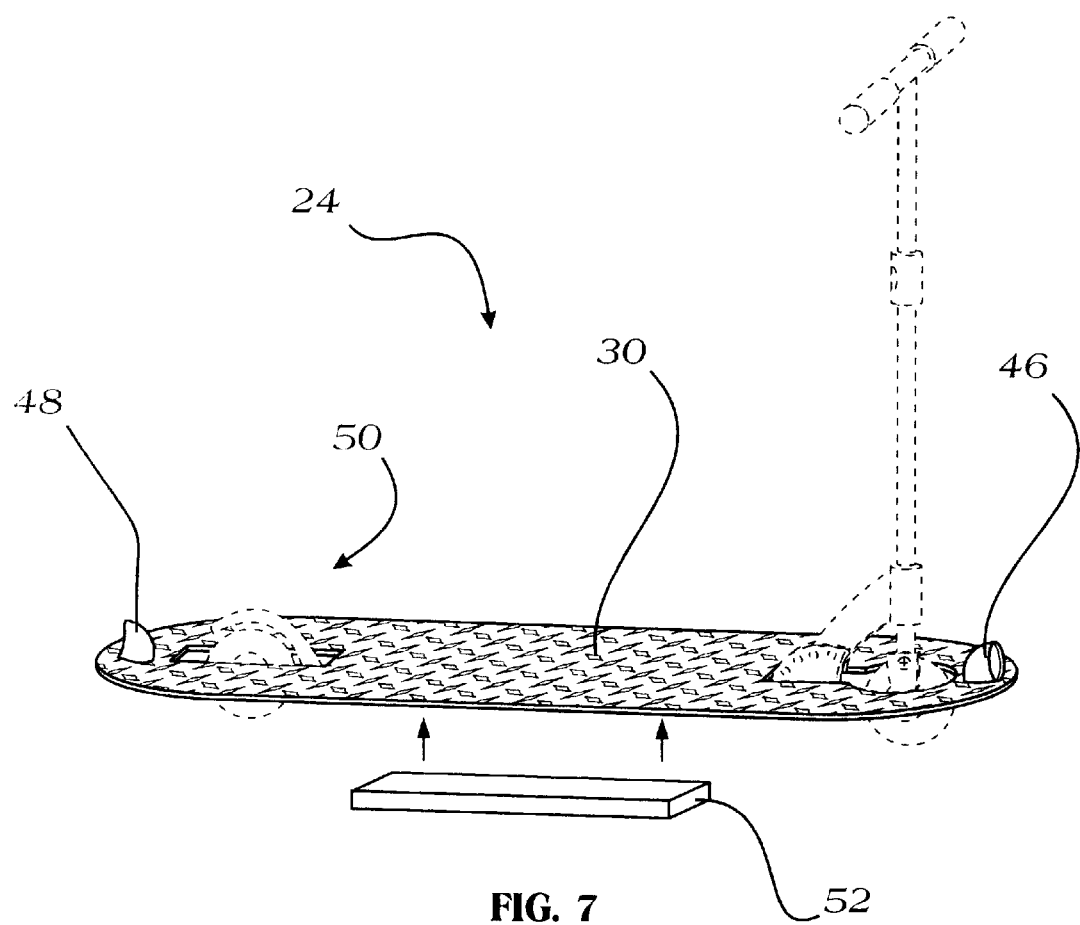
FIG. 7 is a partially exploded perspective view of the footplate of FIGS. 1–6, further including head and tail lights.

Optional attachments are further available for the footplate 24 of the present invention, as shown in FIG. 7. FIG. 7 is a partially exploded perspective view of the footplate 24 of FIGS. 1–6, further including head and tail lights 46 and 48, respectively. In this embodiment, the headlight is fixed to the front end of the deck 30, and the tail light is fixed to the rear end of the deck 30; these lights provide aesthetic improvement to the conventional scooter, but also increased safety and utility for riding at night. Furthermore, the footplate 24 attachments would include a battery means 52, such as a rechargeable battery pack or a group of disposable batteries, which attaches to the bottom of the scooter (see FIG. 8, below) to provide power to the headlight 46 and tail light 48. Still further, it might to be desirable that the tail light 48 change it's light configuration whenever the scooter brake (see FIG. 1) is depressed. To provide such functionality, the footplate 24 can include a brake position switch 50 wired between the battery means 52 and the tail light 48 that will cause the tail light 48 to become brighter whenever the rider depresses the scooter brake (see FIG. 1). If we turn to FIG. 8, we can see an example of the wiring for the system of FIG. 7.

Figure 8:
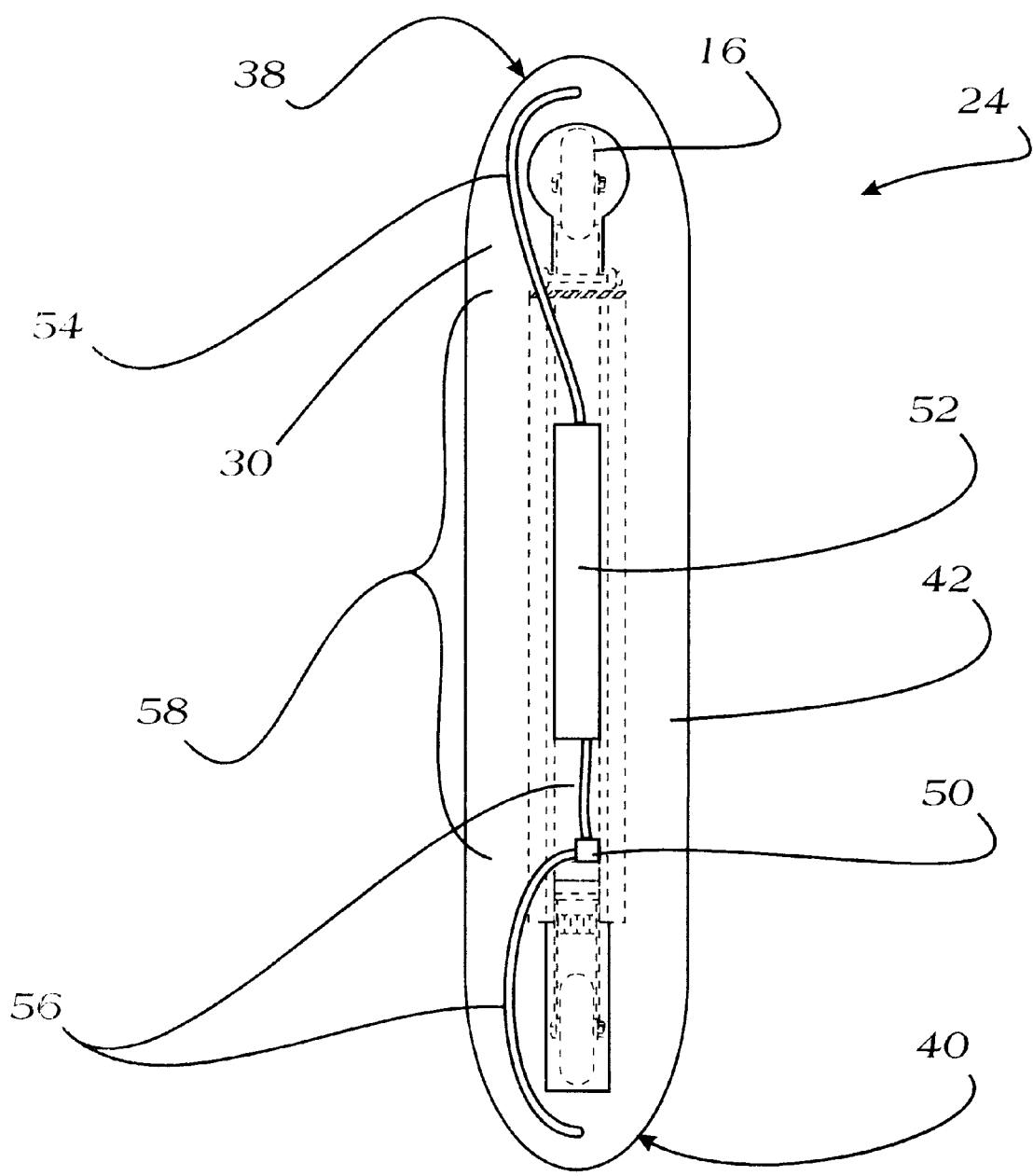
FIG. 8 is a bottom view of the footplate assembly of FIG. 7.

FIG. 8 is a bottom view of the footplate 24 assembly of FIG. 7. As can be seen the battery means 52 is preferably detachably inserted within the channel 58 formed in the bottom side of the conventional scooter deck; as such, it will be virtually invisible from the sides or top of the scooter when the battery means 52 is installed therein. As shown, the battery means 52 will preferably provide power to the headlight via a headlight power cable 54. Similarly, the battery means 52 will provide power to the tail light via the tail light power cable 56. If a brake position switch 50 is installed, then it will be wired in between the battery means 52 and the tail light. Although it is not shown here, it should be realized that there will be a main power shutoff switch that will permit the user to manually turn the power off and on to the headlight and tail light.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A footplate for scooters, said scooters defined by a front wheel, a deck, and a rear wheel, the footplate comprising:
   a deck defined by a front end and a rear end;
   a front wheel aperture formed in said deck adjacent to said front end for receiving the scooter front wheel therethrough;
   a rear wheel aperture formed in said deck adjacent to said rear end for receiving the scooter rear wheel therethrough; and
   fastening means for fastening said deck to said scooter deck.

2. The footplate of claim 1, wherein said deck is further defined by a top surface and a bottom surface, and said top surface comprises a textured contour.

3. The footplate of claim 1, further comprising a headlight assembly attached to said deck between said front end and said front wheel aperture.

4. The footplate of claim 3, further comprising a tail light assembly attached to said deck between said rear end and said rear wheel aperture.

5. The footplate of claim 4, wherein said scooter deck is further defined by a bottom side, said footplate further comprising:
   a battery pack attachable to the bottom side of the scooter deck, said battery back attached to said headlight assembly by a headlight power cable and said battery pack further attached to said tail light assembly by a tail light power cable.

6. The footplate of claim 5, wherein the scooter further comprises a brake/fender assembly, said footplate further comprising a brake position switch connected to said tail light power cable to change the lighting configuration of said tail light assembly responsive to the position of the scooter brake/fender assembly.

7. The footplate of claim 4, wherein said front wheel aperture comprises a shape defined by a rounded portion and a slotted portion.

8. The footplate of claim 7, wherein said rear wheel aperture comprises a slotted shape.

* * * * *